US010677289B2

(12) United States Patent
Burchert et al.

(10) Patent No.: US 10,677,289 B2
(45) Date of Patent: Jun. 9, 2020

(54) METHOD FOR SUPPORTING A SPINNING ROTOR AND BEARING SYSTEM, SPINNING ROTOR AND SUPPORT BEARINGS

(71) Applicant: RIETER CZ S.R.O., Usti nad Orlici (CZ)

(72) Inventors: Mathias Burchert, Ostfildern (DE); Milan Moravec, Usti nad Orlici (CZ); Markus Kuebler, Geislingen (DE); Jiri Sloupensky, Usti nad Orlici (CZ); Siegfried Silber, Kirchschlag (AT); Peter Dirnberger, St. Florian (AT)

(73) Assignee: RIETER CZ s.r.o., Usti nad Orlici (CZ)

( * ) Notice: Subject to any disclaimer, the term of this patent is extended or adjusted under 35 U.S.C. 154(b) by 44 days.

(21) Appl. No.: 15/901,276

(22) Filed: Feb. 21, 2018

(65) Prior Publication Data

US 2018/0238388 A1 Aug. 23, 2018

(30) Foreign Application Priority Data

Feb. 22, 2017 (DE) .......................... 10 2017 103 622

(51) Int. Cl.
*F16C 32/06* (2006.01)
*F16C 32/04* (2006.01)
*D01H 4/12* (2006.01)

(52) U.S. Cl.
CPC .......... *F16C 32/0614* (2013.01); *D01H 4/12* (2013.01); *F16C 32/048* (2013.01); *F16C 32/0474* (2013.01); *F16C 32/0476* (2013.01); *F16C 2340/18* (2013.01); *F16C 2380/26* (2013.01)

(58) Field of Classification Search
CPC .............. F16C 32/0402; F16C 32/0474; F16C 32/0476; F16C 32/048; F16C 2340/18; F16C 2380/26; F16C 25/045; F16C 17/08; D01H 4/12
See application file for complete search history.

(56) References Cited

U.S. PATENT DOCUMENTS 3,934,950 A * 1/1976 Kuhlmann ............... F16C 17/08
310/90.5
4,022,008 A * 5/1977 Pimiskern ................ D01H 4/12
384/241

(Continued)

FOREIGN PATENT DOCUMENTS

DE 26 34 070 A1 2/1978
DE 43 42 584 A1 6/1995

(Continued)

OTHER PUBLICATIONS

German Patent Office Search Report, dated Oct. 19, 2017.
EPO Search Report, dated Aug. 22, 2018.

*Primary Examiner* — Alan B Waits
(74) *Attorney, Agent, or Firm* — Dority & Manning, P.A.

(57) ABSTRACT

A bearing system and associated method of operation are provided to support a spinning rotor having a pot and a shaft of an open-end spinning device with two radial bearings and at least one axial support bearing, wherein at least one of the radial bearings is an active magnetic bearing. The axial support bearing is configured such that a magnetic bearing acts in opposition to one or both of an aerostatic air bearing or a mechanical starting element.

8 Claims, 5 Drawing Sheets

(56) References Cited

U.S. PATENT DOCUMENTS

| | | | | |
|---|---|---|---|---|
| 4,519,205 A * | 5/1985 | Gubler | D01H 4/14 384/119 |
| 4,726,640 A * | 2/1988 | Iwama | F16C 17/026 310/90.5 |
| 5,172,021 A * | 12/1992 | Takahashi | F16C 32/0402 310/156.04 |
| 5,448,121 A * | 9/1995 | Tada | G02B 26/121 310/90 |
| 5,535,582 A * | 7/1996 | Paweletz | D01H 4/14 310/67 R |
| 5,548,950 A | 8/1996 | Paweletz | |
| 5,637,941 A * | 6/1997 | Paweletz | D01H 4/10 310/90.5 |
| 5,710,494 A | 1/1998 | Paweletz | |
| 5,987,871 A | 11/1999 | Winzen | |
| 6,006,510 A * | 12/1999 | Coenen | D01H 4/12 57/404 |
| 6,124,658 A * | 9/2000 | Coenen | D01H 4/12 310/90 |
| 6,265,798 B1 * | 7/2001 | Huang | F16C 25/045 310/90 |
| 6,430,261 B1 * | 8/2002 | Bathe | H01J 35/103 378/132 |
| 6,439,773 B1 * | 8/2002 | Fujikawa | F16C 32/0696 384/100 |
| 6,695,479 B2 * | 2/2004 | Pohn | F16C 32/0622 384/100 |
| 6,982,510 B1 * | 1/2006 | Ajello | F16C 17/045 310/51 |
| 7,605,509 B2 * | 10/2009 | Buhren | D01H 4/14 310/156.08 |
| 9,771,670 B2 * | 9/2017 | Burchert | D01H 4/14 |
| 2002/0002816 A1 | 1/2002 | Coenen | |
| 2003/0006756 A1 * | 1/2003 | Tsuruta | F16C 32/0696 269/21 |
| 2004/0189125 A1 * | 9/2004 | Doemen | F16C 17/08 310/90.5 |
| 2010/0148607 A1 * | 6/2010 | Shirai | F16C 17/02 310/90 |
| 2012/0299418 A1 * | 11/2012 | Woo | H02K 7/09 310/90 |
| 2015/0308418 A1 * | 10/2015 | De Vries | F03G 7/00 74/572.11 |
| 2015/0361593 A1 * | 12/2015 | Burchert | D01H 4/14 57/406 |
| 2016/0208804 A1 * | 7/2016 | Kumano | F04D 1/00 |

FOREIGN PATENT DOCUMENTS

| | | |
|---|---|---|
| DE | 44 21 406 A1 | 12/1995 |
| DE | 197 29 191 A1 | 1/1999 |
| DE | 198 27 606 A1 | 12/1999 |
| DE | 10 2006 053 734 A1 | 5/2008 |
| DE | 10 2014 108 526 A1 | 12/2015 |
| EP | 1 154 340 | 11/2001 |
| WO | WO 93/05310 A1 | 3/1993 |

* cited by examiner

METHOD FOR SUPPORTING A SPINNING ROTOR AND BEARING SYSTEM, SPINNING ROTOR AND SUPPORT BEARINGS

FIELD OF THE INVENTION

The invention relates to a method for supporting a spinning rotor that has a pot and a shaft of an open-end spinning device with two radial bearings and at least one axial support bearing, along with a corresponding bearing system, a spinning rotor, and a support bearing for a spinning rotor.

BACKGROUND

A rotor drive of an open-end spinning device is known from DE 10 2006 053 734 A1. The rotor drive drives a shaft and a spinning rotor arranged thereon. The shaft is a part of a traveler of the rotor drive and is magnetically supported on both sides of the rotor drive. The support takes place by means of two permanent magnet rings and a defined energizable magnetic bearing coil. Such elements and an inductive sensor are used to control the axial position of the spinning rotor, which is free-floating during operation. To be sure, it is possible to, in this manner, determine the axial position of the shaft and thus the spinning rotor with relative accuracy, and to maintain it. However, in doing so, the radial position of the shaft and the spinning rotor move in a relatively large tolerance. However, in order to be able to spin a uniform and uninterrupted thread, in addition to the axial position, the radial position of the spinning rotor is extremely important.

A radial magnetic bearing is known from WO 93/05310 A1. A shaft is arranged between pole arms of a stator, which are surrounded by a coil. The shaft is radially centered and held by a magnetic field between the coils. The bearing system and centering can take place by means of an active control system.

SUMMARY OF THE INVENTION

A task of the present invention is to provide a method for supporting a spinning rotor of an open-end spinning device and a corresponding bearing for it, a spinning rotor and a support bearing, which allow a stable radial and axial support of the spinning rotor, in order to be used at very high speeds, such as 200,000 revolutions/min. The invention should be able to absorb forces that act on the spinning rotor from different directions, and compensate for them in such a manner the spinning rotor is suitable for the production of high-quality yarn. Additional objects and advantages of the invention will be set forth in part in the following description, or may be obvious from the description, or may be learned through practice of the invention.

The tasks are achieved with a method, a bearing system, a spinning rotor and a support bearing with the characteristics described and claimed herein.

The method in accordance with the invention is used for supporting a spinning rotor that has a pot and a shaft of an open-end spinning device. It uses two radial bearings and at least one axial support bearing, by which the spinning rotor is mounted in the open-end spinning device. At least one of the radial bearings acts in an actively magnetic manner. In addition, the spinning rotor is supported axially by means of the axial support bearing in such a manner that, on the one hand, an aerostatic air bearing and/or a mechanical starting element and, on the other hand, a magnetic bearing are provided, which act against each other.

Typically, active magnetic radial bearings already generate axial support forces, such that a separate axial support bearing is usually not required. However, forces of all kinds act on a spinning rotor, which can cause the spinning rotor to be moved from its provided position. This is highly disadvantageous, since, by changing the position of the pot of the spinning rotor in which the yarn is produced, unevenness in the yarn can arise, which can even lead to thread breakage. By using an additional axial support bearing, the spinning rotor is supported axially so strongly that it can compensate for the axial forces acting on it. Such axial forces, such as compressive forces, can arise when feeding fibers into the rotor. On the other hand, pulling forces act on the spinning rotor, which, for example, are generated by a suction force that applies in the rotor housing in which the spinning rotor rotates. The axial support bearing, which is, on the one hand, an aerostatic air bearing and/or a mechanical starting element and, on the other hand, a magnetic bearing, which act against each other, may be a combination of an air bearing and a magnetic bearing or a mechanical starting element and a magnetic bearing. It is also possible that a combination of an air bearing and a magnetic bearing is selected, and a mechanical starting element is additionally provided. Depending on the design of the spinning device, it may be more advantageous if the axial support bearing exerts pulling forces on the spinning rotor in order to compensate for compressive forces from the spinning process. However, with another design, it may also be advantageous that the axial support bearing acts in such a manner that it compensates for pulling forces and accordingly exerts a compressive force on the spinning rotor.

Advantageously, the axial support bearing acts without contact, at least in spinning operation. Due to the contact-free bearing system of the shaft, the spinning rotor can be operated in an energy-saving manner. The mechanical starting element is in operation preferably only during the start-up phase, the deceleration phase, or under the action of strong external forces. In such a case, the main purpose is to avoid damage to components.

In a particularly advantageous design of the invention, the axial support bearing is an active (that is, a controlled) support bearing, which is able to compensate for both pulling and compressive forces and to keep the spinning rotor in a highly uniform position. Such a support bearing ensures particularly good running characteristics of the spinning rotor, and thus contributes to a particularly good spinning result. In addition to the main function of maintaining the position of the spinning rotor, the axial support bearing can also be used to shift the position of the spinning rotor into one or more additional positions. The spinning rotor can then be operated in a manner axially displaced to a first position. This can be helpful if the gap between a cover covering the rotor housing and the spinning rotor is to be enlarged, for example for preparing the thread end or for cleaning the rotor. After such enlargement of the gap, the spinning rotor can be moved back to its original first position. In one design of the invention that is more simple, but which is frequently sufficient, the support bearing comprises a passive axial bearing.

In an advantageous design of the invention, the spinning rotor is axially supported at the shaft end and/or in at least one additional area, in particular in the area of the radial bearing or the pot. In particular, two of such axial supports generate forces on the shaft of the spinning rotor that are directed against each other. Thereby, a particularly rigid axial bearing of the spinning rotor can be achieved, which can withstand both pulling and compressive forces very well.

As already described, the axial support bearing exerts pulling and/or compressive forces on the shaft of the spinning rotor, in order to be able to compensate for axial forces acting on the shaft from the outside, in particular through the spinning operation.

Preferably, the distance between the support bearing and a reference point on the spinning rotor, in particular on the shaft, is measured and controlled to the effect that it remains as unchanged as possible. As a result, despite varying forces acting on the spinning rotor, a predetermined position, which is as constant as possible, of the spinning rotor is obtained.

A bearing system of a spinning rotor in accordance with the invention that has a pot and a shaft of an open-end spinning device features two radial bearings and at least one axial support bearing. In accordance with the invention, at least one of the radial bearings acts in an actively magnetic manner, and the spinning rotor is equipped by means of the axial support bearing, on the one hand, with an aerostatic air bearing and/or a mechanical starting element and, on the other hand, with a magnetic bearing, which act against each other. Thus, the bearing system in accordance with the invention is able to compensate for forces that are even larger, in particular those that arise in spinning operation, and keep the spinning rotor in a position that is as constant as possible. The bearing system may be a combination of an air bearing and a magnetic bearing, or a mechanical starting element and a magnetic bearing. It is also possible that a combination of an air bearing and a magnetic bearing is selected, and a mechanical starting element is additionally provided.

Advantageously, the axial support bearing is a largely contact-free bearing during spinning operation. Thereby, the spinning rotor can be operated in an energy-saving manner.

It is particularly advantageous if the axial support bearing is an active bearing. The active bearing controls the position of the spinning rotor, such that, upon a change to the position of the spinning rotor, a correspondingly increased force on the part of the support bearing acts on the spinning rotor, in order to once again compensate for the position of the spinning rotor. By this, the spinning rotor can be held in a very stable position. It is also possible to define and maintain different axial positions of the spinning rotor.

In a particularly preferred design of the bearing system, the axial support bearing is an active bearing. The active bearing controls the position of the spinning rotor in such a manner that, as far as possible an equal distance to the support bearing is maintained. The support bearing works with the spinning rotor without contact. Through electrical signals that determine the position of the spinning rotor directly or indirectly, the axial support bearing will more or less strongly influence the actual position of the spinning rotor, and attempt to bring it into the target position. If the spinning rotor is too close to the contact-free support bearing, the control allocated to the support bearing will move the spinning rotor a little further away. Conversely, if the spinning rotor is too far away from the axial support bearing, the control will once again move the spinning rotor closer to the axial support bearing. In this manner, an axial support bearing acting in a wear-free manner is used in the bearing system of the spinning rotor. This configuration can determine and maintain the position of the spinning rotor with a high degree of accuracy. The corresponding spinning result with such an actively radially and axially mounted spinning rotor is highly uniform and advantageous.

In one design of the invention, it is provided that two axial support bearings are arranged relative to each other in such a manner that they generate mutually opposing forces on the spinning rotor, in particular on the shaft of the spinning rotor. By this, the spinning rotor is clamped without contact between the two axial support bearings. Preferably, such two axial support bearings—or at least one of them—are also active bearings.

In a preferred design of the invention, the axial support bearing working in a contact-free manner features a starting element acting as a mechanical stop for the shaft, which serves as an emergency bearing. In the event that a large force acts on the spinning rotor, which cannot be supported by the axial support bearing working in a contact-free manner, the mechanical stop for the shaft is provided. The starting element can be designed to be wear-resistant, such that it is damaged as little as possible by the start of the shaft. It can also be designed as a particularly effective friction surface for the material of the shaft of the spinning rotor, such that a gradual coasting down of a spinning rotor that is still spinning is possible upon the stopping of the spinning rotor. Alternatively, a high degree of friction can be effected on the spinning rotor through the starting element, by which a deceleration of the spinning rotor when contacting the starting element takes place as quickly as possible. In particular, if, upon the failure of the radial bearing and the contact-free axial support bearing, the spinning rotor is to decelerate safely, it is advantageous if the bearing system is designed in such a manner that the spinning rotor moves in the direction of the starting element. By this, the spinning rotor is moved into a defined position and is selectively decelerated by the contact with the starting element.

One of the preferred designs of the support bearing is that it is formed as a static air bearing, which axially supports the spinning rotor, in particular its shaft, by building up an air cushion between the spinning rotor, in particular the shaft end and the air bearing. Through a permanent air flow, which flows against the spinning rotor, the axial support of the spinning rotor is effected. By varying the air flow, the position of the spinning rotor can be changed in the axial direction or, at external forces on the spinning rotor with varying strength, can be controlled in such a manner that the spinning rotor maintains its position with a high degree of stability.

If the support bearing is formed as a magnetic bearing, in a particularly advantageous manner, a design of the invention that is capable of exerting pulling and/or compressive forces on the spinning rotor is provided. The magnetic bearing, which can be electrically controlled, can compensate for different external forces by varying the pulling and/or compressive force on the spinning rotor. With a corresponding magnetic bearing, the control of the position of the spinning rotor is adjustable with a high degree of accuracy. Thus, the spinning rotor can very well perform its task of producing an excellent yarn.

It is particularly advantageous if the support bearing is an active magnetic bearing that features an electrical coil that is allocated to the spinning rotor, in particular the shaft or shaft end, in such a manner that pulling and/or compressive forces can be selectively applied to the spinning rotor. Through a corresponding control of the electric coil, a more or less large force, which holds the spinning rotor in the desired position, is generated. Thereby, there can be compensation for the forces from the outside acting on the spinning rotor. With an active magnetic bearing, the axial positioning of the spinning rotor can be achieved in a particularly advantageous manner.

If a printed circuit board equipped with electrical components for the control of the active magnetic bearing is allocated to the magnetic bearing, a compact design is possible. Thereby, the bearing unit for the spinning rotor can be very easily assembled and disassembled. This is particularly important, since such units are very common with rotor spinning machines. At present, spinning machines with 600 spinning units are available on the market. The ability to easily replace the bearing system, in the event of a defect, is therefore important in order not to affect the productivity of the spinning machine too greatly.

If a magnet is arranged at the shaft end of the spinning rotor, whereas the magnet works together with the coil of the active magnetic bearing, a preferred design of the invention, which is simple in its design, is obtained. The magnet can be easily installed in the shaft or attached to it. However, the coil, with its control, can be arranged in the bearing unit in a stationary manner. This in turn results in a particularly simple, robust and reliable design.

In order to optimally guide the magnetic flux, it is particularly advantageous if the magnet at the shaft end of the spinning rotor is surrounded by a non-magnetic material, in particular aluminum or plastic. As a result, a demarcation from the material of the shaft of the spinning rotor is possible. Thereby, the axial magnetic bearing can work very effectively and with little loss.

The support bearing is preferably a passive magnetic bearing, whereas the magnet of the magnetic bearing is arranged on the holder, in particular on the starting element. The holder may, for example, be a replaceable or adjustable component that is changed in its position relative to the end of the shaft. Thus, among other things, the force with which the magnet acts relative to the end of the shaft is adjustable.

If, in an advantageous design, at least one opening directed towards the end of the shaft of the spinning rotor is arranged in the starting element, an air cushion can be built up between the spinning rotor, in particular the shaft end, and the bearing system as a static air bearing.

If the mechanical starting element features a flat or punctiform contact point for the shaft end of the spinning rotor, damage to the spinning rotor or the bearing can be prevented in the start-up or deceleration phase of the spinning rotor or in the case of an external force acting on the spinning rotor. In particular, in the case of a flat contact point, it is advantageous if a suitable friction surface is used for the material of the shaft end. Such a friction surface may be, for example, carbon or a plastic, for example polyimide. In the case of a punctiform contact point, it is advisable that a ball or a ball-shaped contour is selected. The ball or the mechanical starting element can be made, for example, of steel. It is also possible to store the ball in a ball joint that is lubricated as needed, in order to keep the resistance at the shaft end as low as possible when there is frequent contact.

A spinning rotor in accordance with the invention is suitable for use in a bearing system as described above. By this, the spinning rotor of the open-end spinning device features a shaft and a magnet arranged on the shaft. The magnet is preferably attached to the shaft end of the spinning rotor and, in a preferred design, is surrounded by a non-magnetic material. The shaft can be firmly integrated into a drive for the spinning rotor. In this case, the pot of the spinning rotor is detachably connected to the shaft. In another design, it is possible for the spinning rotor to feature a shaft with a pot firmly arranged on it. In any event, it is advantageous if a simple removal of the spinning rotor from the bearing system is possible when the spinning rotor is to be replaced. In both cases, the corresponding magnet, which is part of the magnetic bearing of the bearing system, is firmly connected to the spinning rotor. In the installed state, such magnet ultimately interacts with a coil of the active magnetic bearing firmly arranged in the bearing system, and effects a predetermined positioning of the spinning rotor within the bearing system or spinning device.

The support bearing in accordance with the invention for a spinning rotor of an open-end spinning device is an active, axially acting magnetic bearing, which works together with a spinning rotor. The axially acting magnetic bearing holds the spinning rotor in an axially predetermined position. It is suitable for use in a bearing system, as previously described. In particular, it should be noted here that such a support bearing in accordance with the invention with a magnet arranged in a preferred design in a shaft end, which is more preferably surrounded by a non-magnetic material, and whereas the magnet works together with a coil arranged in a stationary manner, is usable even in a bearing system that uses radial bearings other than as described above. Other radial bearings can be, for example, passive radial bearings. In addition to the described magnetic radial bearing system, they can also be effected pneumatically or mechanically, for example through supporting discs or a rolling bearing.

BRIEF DESCRIPTION OF THE DRAWINGS

Further advantages of the invention are described in the following embodiments. The following is shown.

DETAILED DESCRIPTION

Figure 1:
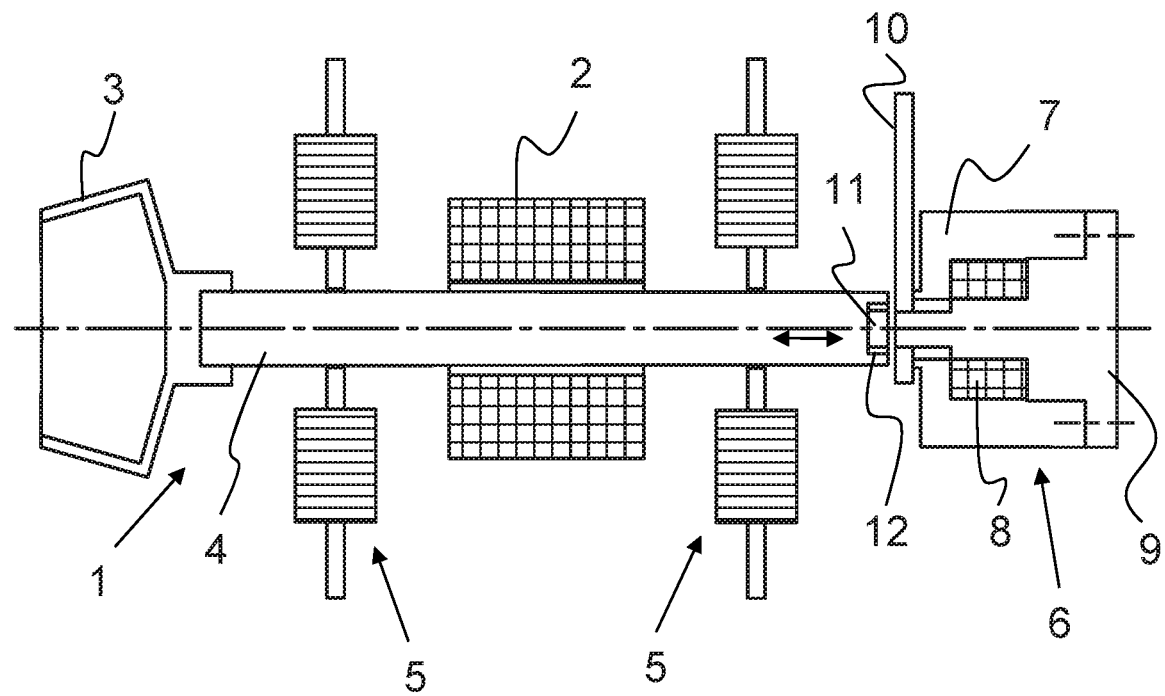
FIG. 1 is a schematic overall view of a spinning rotor with a drive and a bearing system.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a schematic illustration of a spinning rotor 1 with a motor 2 as its drive and an axial support bearing 6 of the spinning rotor 1. The spinning rotor 1 features a pot 3 that is connected to a shaft 4. The connection between the pot 3 and the shaft 4 can take place firmly, for example by welding, pressing or gluing. However, it can also represent a detachable connection, by which the pot 3 is interchangeably held by the shaft 4. The shaft 4 is the rotating rotor of the motor 2 and thereby can be set in a rotary motion. In this manner, more than 200,000 revolutions/min of the shaft 4, and thus of the spinning rotor 1, can be generated.

In this embodiment, the bearing system of the spinning rotor 1 consists of two active radial bearing systems 5 and an active axial bearing 6. In two degrees of freedom, the active radial bearings 5 support the shaft 4 between electromagnets without contact. As long as they are supplied with energy, it is possible to position the shaft 4 between them without contact. Although, given their design, the active radial bearing systems 5 effect a certain axial guidance of the shaft 4, this is not sufficient in many applications. External forces that can act on the spinning rotor 1, such as, for example, the negative pressure in the rotor housing, the feeding of fibers or the abrupt interruption of the fiber feed, or pressure differences in the individual spinning phases, can effect an axial displacement of the shaft 4. To largely avoid this, the active axial bearing 6 is provided; it is preferably arranged at the end of the shaft 4, which is opposite to the pot 3.

The active axial support bearing 6 comprises a holder 7 for fixing a coil 8 and a core 9 along with a control board 10. The coil 8 surrounds the core 9 and is controlled by the control located on the board 10. Electromagnetic forces, which act through the holder 7 on the shaft 4 of the spinning rotor 1, are generated through the coil 8. Depending on the polarity of the voltage applied at the coil 8, such electromagnetic forces attempt to repel or attract the shaft 4. With a magnet 11, which is arranged at the end of the shaft 4 on the spinning rotor 1 and which works together with the core 9, an attractive force that compensates for the repulsion of the electromagnetic forces or enhances the attraction by the electromagnetic forces is generated. The control on the board 10 causes the distance between the axial support bearing 6 and the shaft end to remain largely the same, by the repulsion of the shaft 4 taking place with more or less strength. In order to largely avoid reciprocal effects between the attraction and repulsion, a non-magnetic material 12 (for example, aluminum) is arranged between the magnetizable material of the shaft 4 at its end and the magnet 11.

Figure 2:
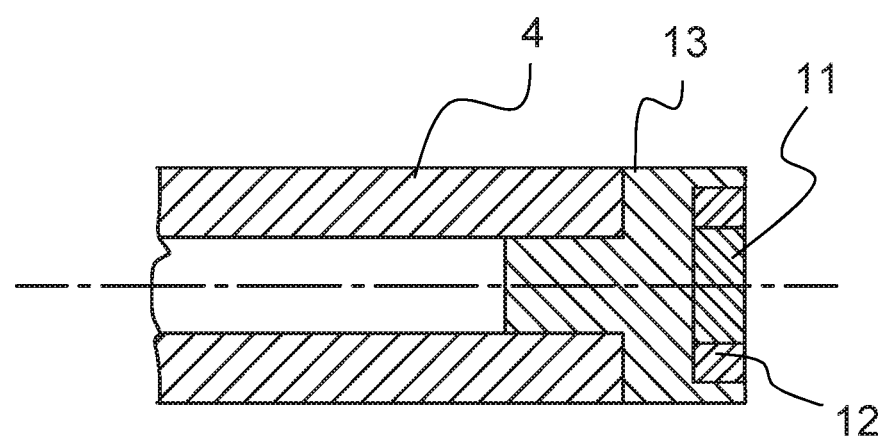
FIG. 2 is a sectional view of a shaft end of a spinning rotor.

FIG. 2 shows the end of the shaft 4 of the spinning rotor 1 in a longitudinal section. The shaft 4 is formed as a hollow shaft, in which a magnet holder 13 is inserted and attached with an extension. The magnet holder 13 supports the magnet 11. The non-magnetic material 12, such as aluminum, surrounds the magnet 11 in an annular manner, and is also received in the magnet holder 13.

In another embodiment, the magnet 11 and the non-magnetic material 12 may also be received directly in the shaft 4. For manufacturing reasons and for the variable design of the shaft end 4, a corresponding magnetic holder 13 can be used. Depending on which axial bearing the shaft 4 faces, instead of a magnet 11 or in addition to the magnet 11, a suitable friction surface for an air bearing can be used at this place. For example, such an air bearing has been offered for some time under the name Aerolager by Rieter. For example, the controlled air bearing can apply the compressive force at the shaft end, and the magnet can apply the pulling force counteracting the compressive force.

Figure 3:
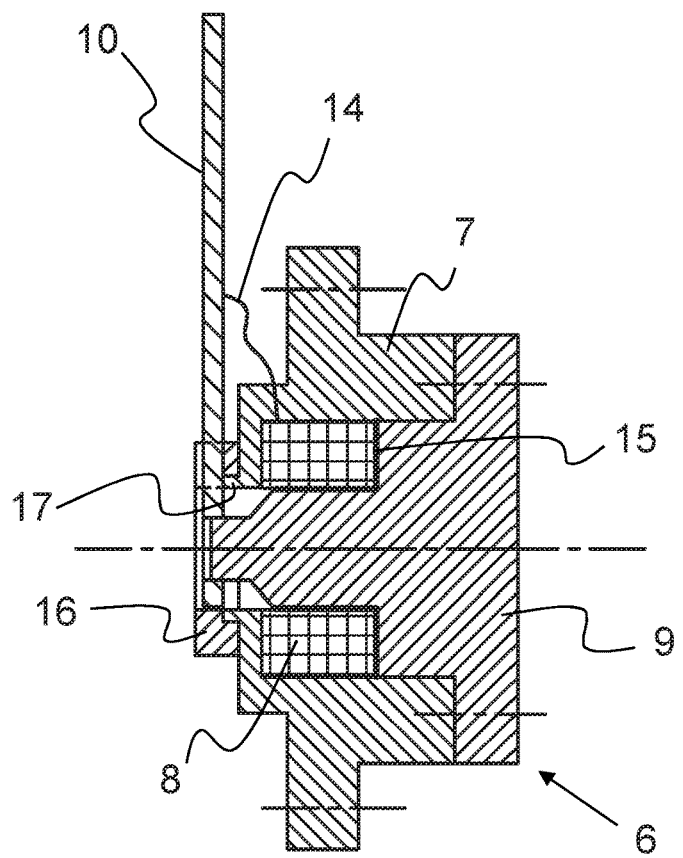
FIG. 3 is an active axial bearing system in a sectional view.

FIG. 3 shows a section through an active magnetic bearing as an axial support bearing 6. The axial support bearing 6 is essentially received in the holder 7. The holder 7 also serves the purpose of attaching the axial support bearing 6 in a carrier (not shown) of the spinning device. The holder 7 is formed to be pot-shaped. The core 9, which is connected to the holder 7, is arranged in the holder 7. The core 9 features tiered taperings, whereas one of such taperings is surrounded by the coil 8. There is insulation 15 between the coil 8 and the core 9. The coil 8 is connected to the control board 10 with an electrical line 14, and can be controlled accordingly in order to exert a compressive force on the shaft 4. Thereby, the distance of the magnet 11 and the spinning rotor 1 from the stationary axial bearing 6 is kept constant or at a defined distance, as the case may be.

A distance sensor that measures the distance between the spinning rotor 1 and the axial support bearing 6 is arranged on the board 10. Depending on the signal of this sensor, the coil 8 is acted upon by more or less current or alternating voltage, as the case may be, in order to exert a more or less strong compressive force or pulling force on the spinning rotor 1, and thereby bring this to the desired position against or in addition to the magnetic force. Through the arrangement of the board 10 on the core 9, a compact design is achieved, which receives both the controller and the sensor as a structural unit with the axial bearing 6.

On the holder 7, a starting element 16 is arranged directly opposite the spinning rotor 1. Such starting element 16 is a favorable friction surface to the shaft end of the spinning rotor 1 and, in the event that the axial bearing 6 fails, causes the spinning rotor 1 to stop without damage to the axial bearing 6 and in a predetermined manner, also without the radial bearing 5 allocated to the spinning rotor 1 being damaged. The starting element 16 may be made of ceramic (for example) in order to protect the axial bearing 6 upon a collision with the spinning rotor 1. However, the starting element 16 can also be designed, for example, as a carbon element or can be made of plastic in order to ensure trouble-free sliding until the spinning rotor 1 is stopped.

Figure 4:
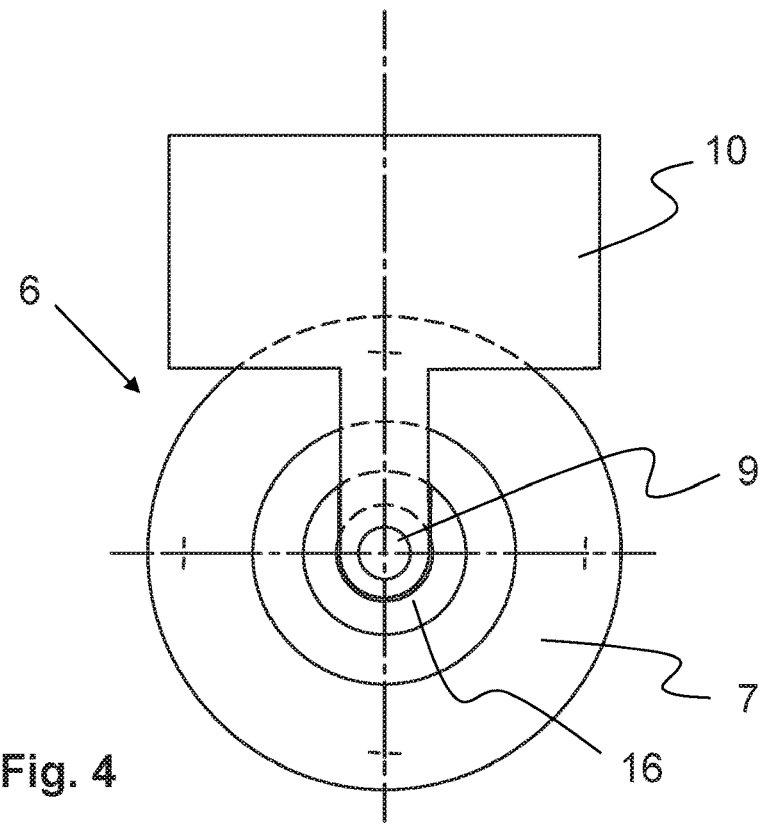
FIG. 4 is a front view of FIG. 3.

For better clarity, FIG. 4 also shows a front view of the axial bearing 6. It is evident from this that the board 10 is allocated to the axial bearing 6. The starting element 16 is cut out in the area of the board 8, in order to avoid a collision of the spinning rotor 1 with the board 10. Fasteners, through which the axial support bearing 6 can be attached to the spinning unit, are indicated on the holder 7.

Figure 5:
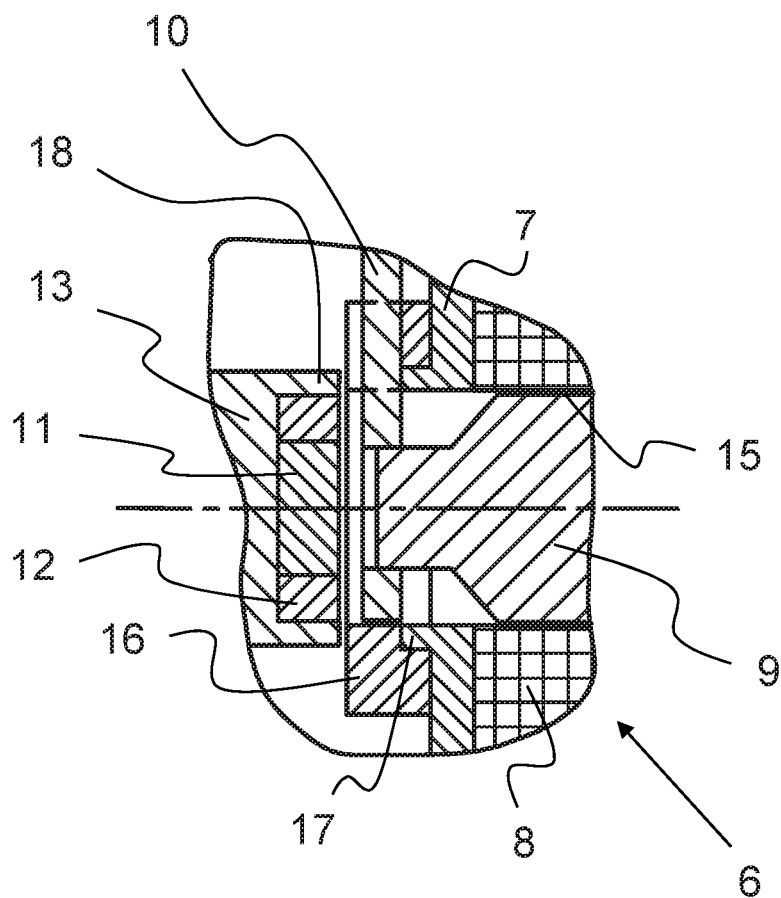
FIG. 5 is a detail in the area of the shaft end and an electromagnetic axial bearing system.

For a better illustration of the design of the axial support bearing 6, FIG. 5 once again presents an enlarged illustration of the interaction between the end of the shaft 4 or the magnet holder 13, as the case may be, and the side of the bearing system 6 turned towards the end of the shaft 4. With this view, it is evident that the magnet 11 faces the tapered core 9. The core 9 consists of magnetizable material. The magnet 11 attempts to attract the core 9. In contrast, the coil 8 acts on the spinning rotor 1, in particular through a collar 17 of the holder 7 on the annular edge 18 of the spinning rotor 1, and attempts to repel it. By changing the repulsive force by means of a modified power supply to the coil, the attraction force of the magnet 11 is more or less overcome and the spinning rotor 1 is kept in balance. Thus, the magnet 11 attracts the spinning rotor 1 at the core 9, while, with a corresponding supplying of current, the coil 8 attempts to push the spinning rotor 1 away. Through the interaction between the pulling force of the magnet 11 and the pressing force of the spool 8, the spinning rotor 1 is kept in balance and a designated distance from the bearing system 6 is maintained. On the other hand, through the forces acting on the spinning rotor 1, it may also be necessary for the magnetic force to have to be increased in order to keep the spinning rotor 1 in the desired position. In this case, by reversing the polarity of the voltage acting on the coil 8, the spinning rotor 1, in addition to the magnetic force, is pulled in its direction. The insulation 15 ensures that, when the coil 8 is energized, the electromagnetic waves interact through the holder 7 or the collar 17, as the case may be, with the annular edge 18 of the magnet holder 13.

In order to ensure a controlled start-up of the spinning rotor 1 at the axial support bearing 6, the starting element 16 is arranged between the collar 17 and the annular edge 18.

If the power supply of the coil 8 fails, the shaft 4 is pulled over the permanent magnet 11 in the direction of the core 9 and makes contact with the starting element 16. The starting element 16 slightly projects above the board 10, such that the spinning rotor 1 cannot make contact with and damage the board 10.

Figure 6:
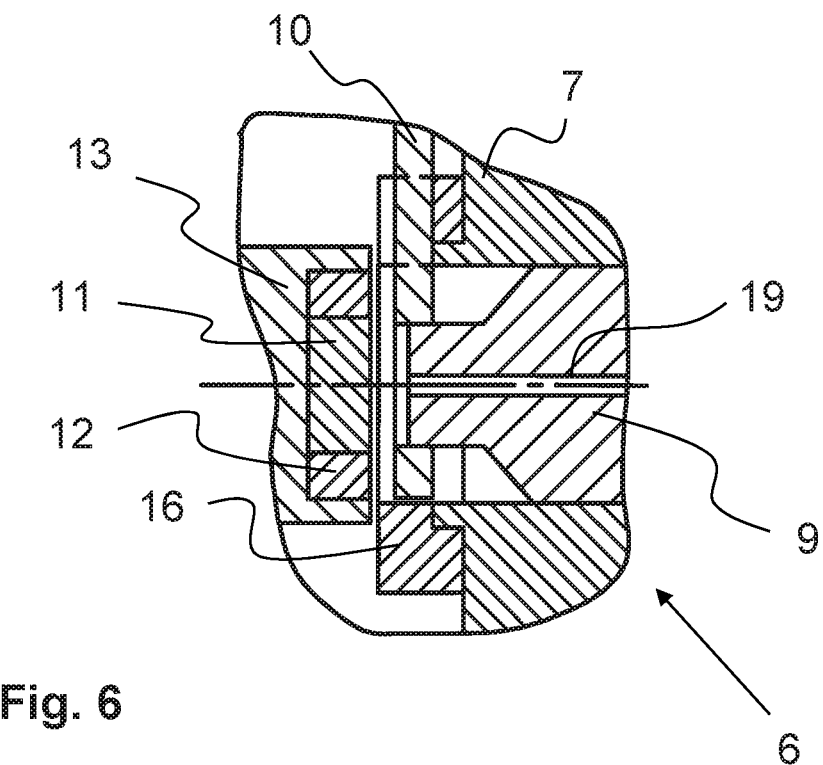
FIG. 6 is a detail in the area of the shaft end and a pneumatic axial bearing system.

Instead of the electromagnetically acting axial support bearing 6 with an electromagnetic coil 8, as shown here, an air bearing may be present instead of such electromagnetic coil 8. In this case, on the one hand, the spinning rotor 1 would be attracted to the axial bearing 6 because of the magnet 11 and the core 9. In this embodiment, instead of the coil 8, in particular centrally positioned in the core 9, one or more air openings 19 (FIG. 6) that direct compressed air against the end of the shaft 4 of the spinning rotor 1 are present. By means of an air flow that is more or less strong, which presses against the shaft 4, a repulsive force, which overcomes the attraction force of the magnet 11, is generated. By controlling such air flow, the spinning rotor 1 is to be kept in balance in the same manner as with the electromagnetic coil 8. This is illustrated schematically in FIG. 6. The change to compressed air can be achieved by a controllable valve.

Figure 7:
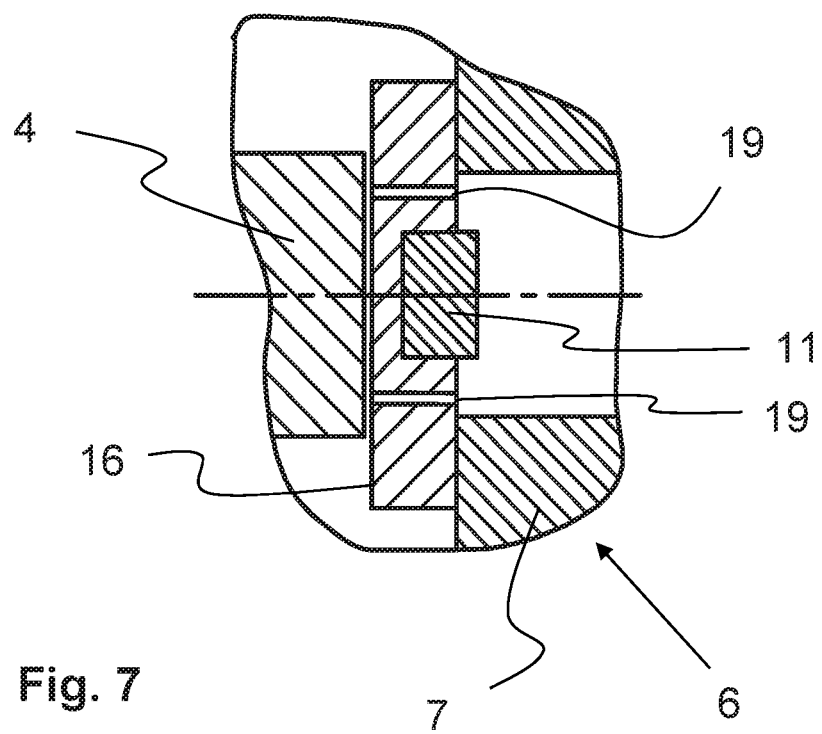
FIG. 7 is a detail in the area of the shaft end and a pneumatic axial bearing system with a permanent magnet.

FIG. 7 shows such a detail in the area of shaft end and pneumatic axial bearing with a permanent magnet 11. Here, the permanent magnet 11 is not arranged on the shaft 4, as described above, but on the holder 7. With this, the magnet 11 is located in the starting element 16 and is covered by it in the direction of the shaft 4. Nevertheless, its magnetic force continues to act on the shaft 4 made of a ferromagnetic material, and attracts it. The starting element 16 consists of a material that gives rise to a good slide pairing with the shaft end. For example, if the shaft end is made of steel, the starting element 16 may be made of carbon or a plastic such as polyimide. If the shaft 4 starts against the starting element 16, the two parts slide on each other, without causing excessive wear. As such, an exchange of the starting element 16 will rarely be required. Moreover, the friction losses are low, such that the energy consumption, especially during start-up of the spinning rotor, is low.

Air openings 19 are arranged in the starting element 16. For example, they surround the permanent magnet 11. On the side of the starting element 16 turned towards the permanent magnet 11, excess pressure is applied, such that air flow is directed against the shaft end. Together with the attractive force of the magnet 11, the repulsive force of the air flow gives rise to an equilibrium that keeps the shaft 4 in a stable state. The material of the starting element 16 may also be porous, such that the air diffuses through the starting element 16.

Figure 8:
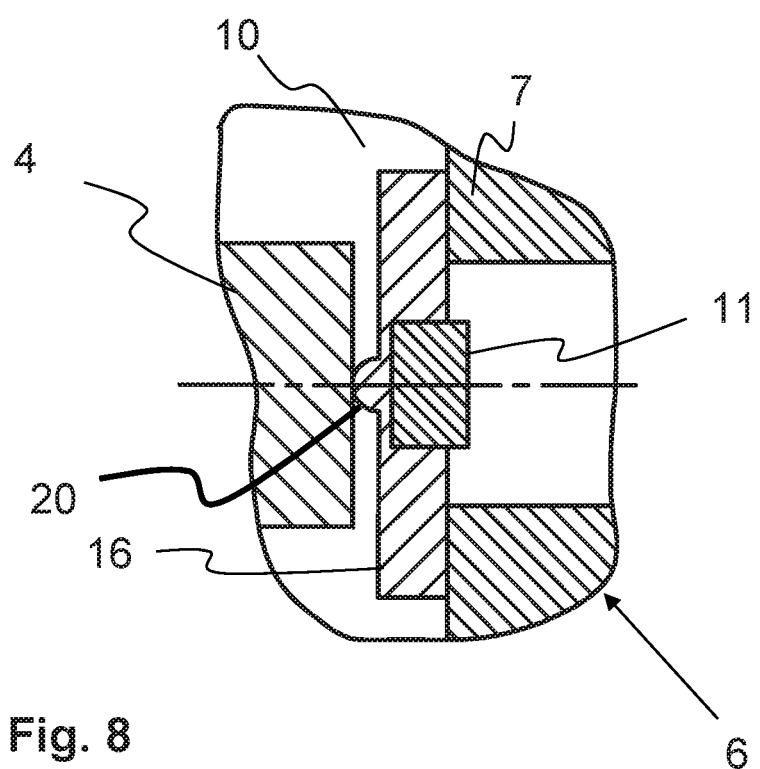
FIG. 8 is a detail in the area of the shaft end and a mechanical starting element with a permanent magnet.

FIG. 8 shows an additional alternative detail in the area of the shaft end and mechanical starting element 16 with a permanent magnet 11. The structure is similar to FIG. 7, but the starting element 16 with air openings 19 is replaced by a starting element 16 with a central projection 20. The shaft 4 can be supported on this projection 20 as needed. This results in a punctiform contact point, which is subject to less friction. The projection can be formed in one piece with the starting element 16, or can be used as a separate component, for example as a ball or a ball section in the starting element 16. As a material for this, steel or ceramic is advisable. The shaft end can also be reinforced with a ceramic insert.

Figure 9:
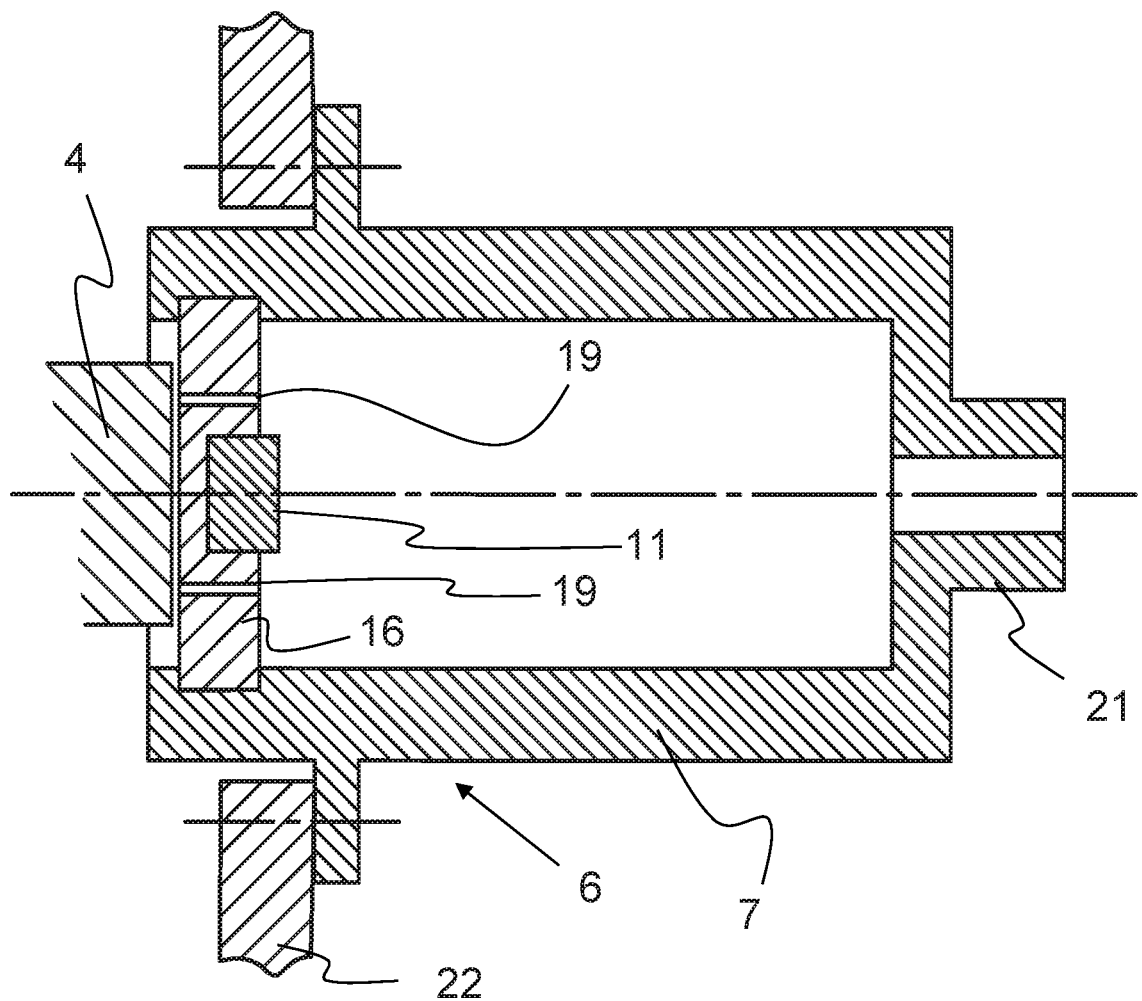
FIG. 9 is a detail in the area of the shaft end and a pneumatic axial bearing system with a permanent magnet in a cartridge.

FIG. 9 shows a design similar to the design according to FIG. 7. The starting element 16 and the magnet 11 are arranged in a replaceable holder 7, which is constructed in the form of a cartridge. The holder 7 features an air connection 21, which can be connected to an excess pressure line (not shown) and an excess pressure source. Thereby, the cartridge can be pressurized in order to generate a flow from the air openings 19, which acts against the force of the magnet 11 on the shaft 4. The holder 7 is attached, for example, by means of screws or a thread on a housing 22 of the spinning station. The design shown here facilitates the manufacture and assembly of the axial bearing, since all important components are combined into one component. Of course, the other embodiments may be constructed by means of such a cartridge.

This invention is not limited to the illustrated and described embodiments. Variations within the scope of the claims, just as the combination of characteristics, are possible, even if they are illustrated and described in different embodiments.

LIST OF REFERENCE SIGNS

1 Spinning rotor
2 Motor
3 Pot
4 Shaft
5 Radial bearing system
6 Axial support bearing system
7 Holder
8 Coil
9 Core
10 Board
11 Magnet
12 Non-magnetic material
13 Magnet holder
14 Line
15 Insulation
16 Starting element
17 Collar
18 Edge
19 Air opening
20 Projection
21 Air connection
22 Housing

The invention claimed is:

1. A bearing system of a spinning rotor having a pot and a shaft of an open-end spinning device, comprising:
  radial bearings, wherein at least one of the radial bearings is an active magnetic bearing;
  an actively controlled axial support bearing comprising a magnetic bearing configured at an end of the shaft that, during normal spinning operations, acts in equilibrium opposition to an oppositely directed force from an actively controlled electrical coil; and
  wherein the electrical coil is configured to act on the shaft of the spinning rotor to controllably apply pulling or compressive forces on the spinning rotor.

2. The bearing system according to claim 1, wherein the equilibrium is maintained such that the axial support bearing is a contact-free bearing relative to the shaft of the spinning rotor.

3. The bearing system according to claim 1, wherein the axial support bearing further comprises a control board for the control of the electrical coil.

4. The bearing system according to claim 1, wherein the magnetic bearing comprises a magnet arranged at the end of the shaft of the spinning rotor.

5. The bearing system according to claim 4, wherein the magnet is surrounded by a non-magnetic material.

6. The bearing system according to claim 1. wherein the magnetic bearing comprises a magnet arranged on a holder of the axial support bearing.

7. The bearing system according to claim 1, further comprising a mechanical starting element directed towards the end of the shaft of the spinning rotor comprising one of a flat or protruding contact point oriented towards an end of the shaft of the spinning rotor.

8. A bearing system of a spinning rotor having a pot and a shaft of an open-end spinning device, comprising:
   radial bearings, wherein at least one of the radial bearings is an active magnetic bearing:
   an actively controlled axial support bearing comprising a magnetic bearing configured at an end of the shaft that, during normal spinning operations, acts in equilibrium opposition to an oppositely directed repulsive force from an actively controlled aerostatic bearing; and
   wherein the aerostatic bearing builds up an air cushion between the end of the shaft of the spinning rotor and the aerostatic bearing, and further comprising a mechanical starting element that is directed towards the end of the shaft of the spinning rotor, the aerostatic bearing comprising at least one opening through the mechanical starting element for directing air to build up the air cushion.

* * * * *